April 3, 1962 D. E. LEFFLER ETAL 3,028,173
INDEPENDENT WHEEL SUSPENSION AND BEARING CONSTRUCTION THEREFOR
Filed March 16, 1959 3 Sheets-Sheet 2

INVENTORS
Dean E. Leffler, &.
BY Donald L. Greenwood
W. F. Wagner
ATTORNEY

April 3, 1962 D. E. LEFFLER ETAL 3,028,173
INDEPENDENT WHEEL SUSPENSION AND BEARING CONSTRUCTION THEREFOR
Filed March 16, 1959 3 Sheets-Sheet 3
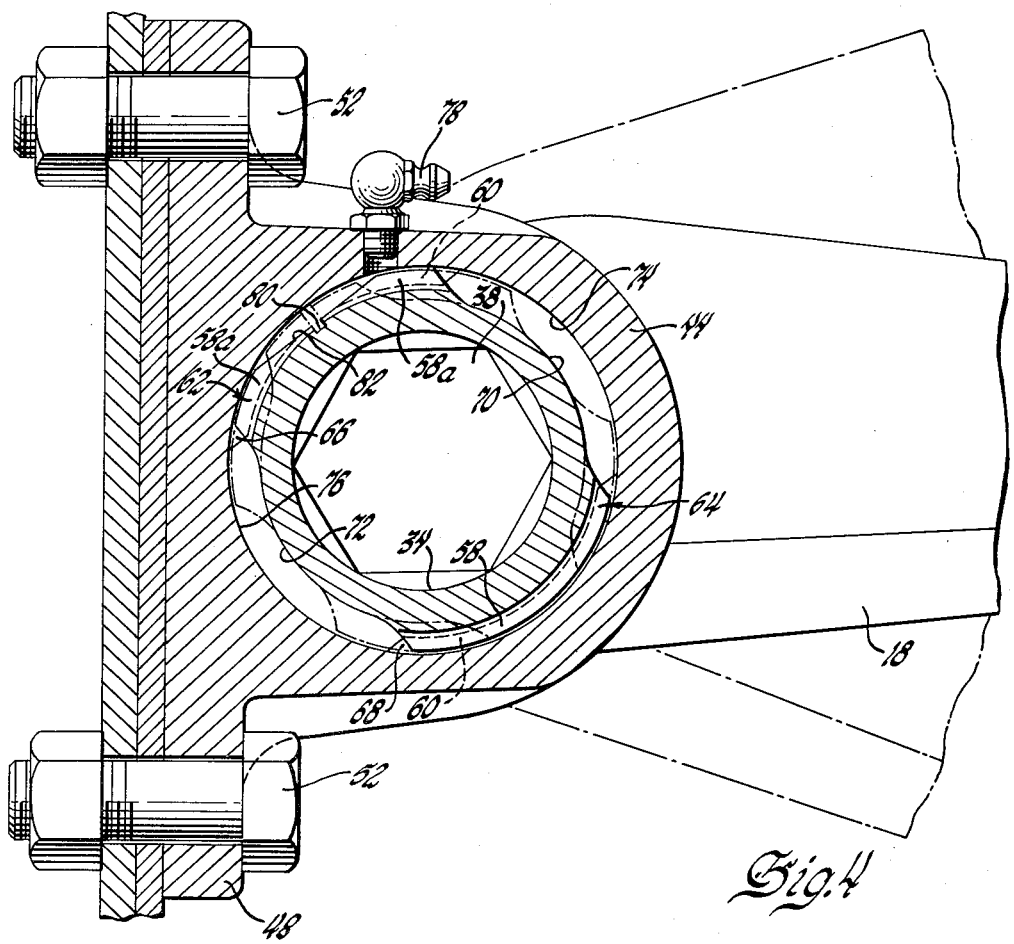
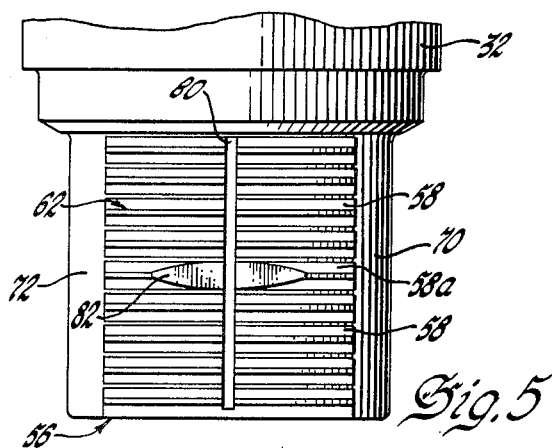
INVENTORS
Dean E. Leffler, &
BY Donald L. Greenwood
W. H. Wagner
ATTORNEY

United States Patent Office 3,028,173
Patented Apr. 3, 1962

3,028,173
INDEPENDENT WHEEL SUSPENSION AND BEARING CONSTRUCTION THEREFOR
Dean E. Leffler, Birmingham, and Donald L. Greenwood, Mount Clemens, Mich., assignors, by direct and mesne assignments, to General Motors Corporation, Detroit, Mich., a corporation of Delaware
Filed Mar. 16, 1959, Ser. No. 799,542
2 Claims. (Cl. 280—96.2)

This invention relates to independent wheel suspension for vehicles and more particularly, although not exclusively, to improved wheel control arm pivot bearing assemblies.

An object of the invention is to provide an improved independent wheel suspension assembly.

Another object is to provide improved independent wheel suspension including vertically spaced transversely extending wheel control arms, wherein the sprung load is supported through the upper control arm by torsionally elastic means.

A further object is to provide an independent wheel suspension structure incorporating improved and simplified bearing means for pivotally attaching wheel control arms to the sprung mass of the vehicle.

Yet another object is to provide a bearing assembly in which bearing engagement between the male and female elements is effected by cooperating no-lead ribs which are disposed in circumferential segments having relieved portions therebetween facilitating assembly and disassembly thereof.

A still further object is to provide a bearing assembly of the type described wherein the ribbed segments of the male and female elements are arranged into diametrically opposed groups which are angularly oriented with respect to the vehicle sprung mass so as to provide optimum angular overlap throughout the maximum range of deflection of the vehicle wheel.

These and other objects, advantages, and features of the invention will become more clearly apparent as reference is had to the accompanying specification and drawings wherein.

Figure 3:
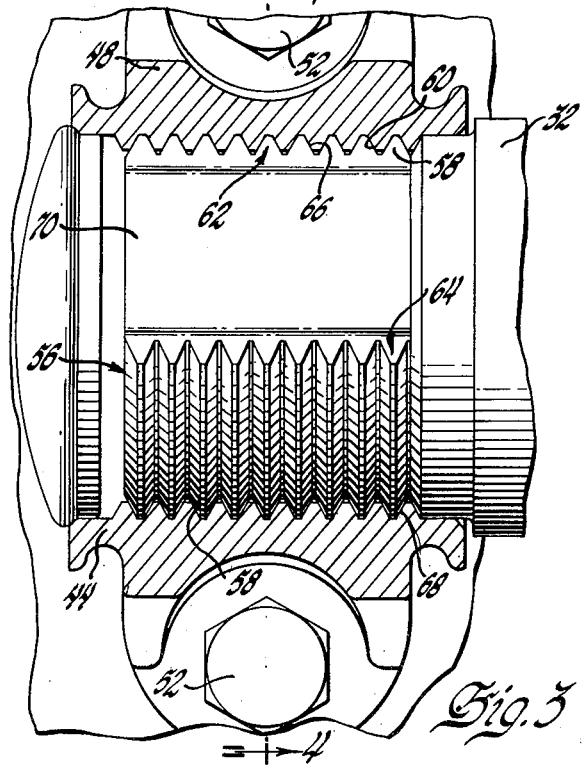
FIG. 3 is an enlarged fragmentary view, partly in section, looking in the direction of arrows 3—3 of FIG. 2, illustrating the details of construction of the pivot bearing assembly.

FIG. 4 is an enlarged fragmentary view, partly in section, looking in the direction of arrows 4—4 of FIG. 3, illustrating the normal angular orientation of the bearing engagement surfaces of the male and female bearing members relative to the vehicle and change in angular relation of the members during various deflected positions of the associated wheel control arm; and FIG. 5 is an enlarged fragmentary view illustrating a feature of the male bearing member shown in FIG. 3.

Figure 1:
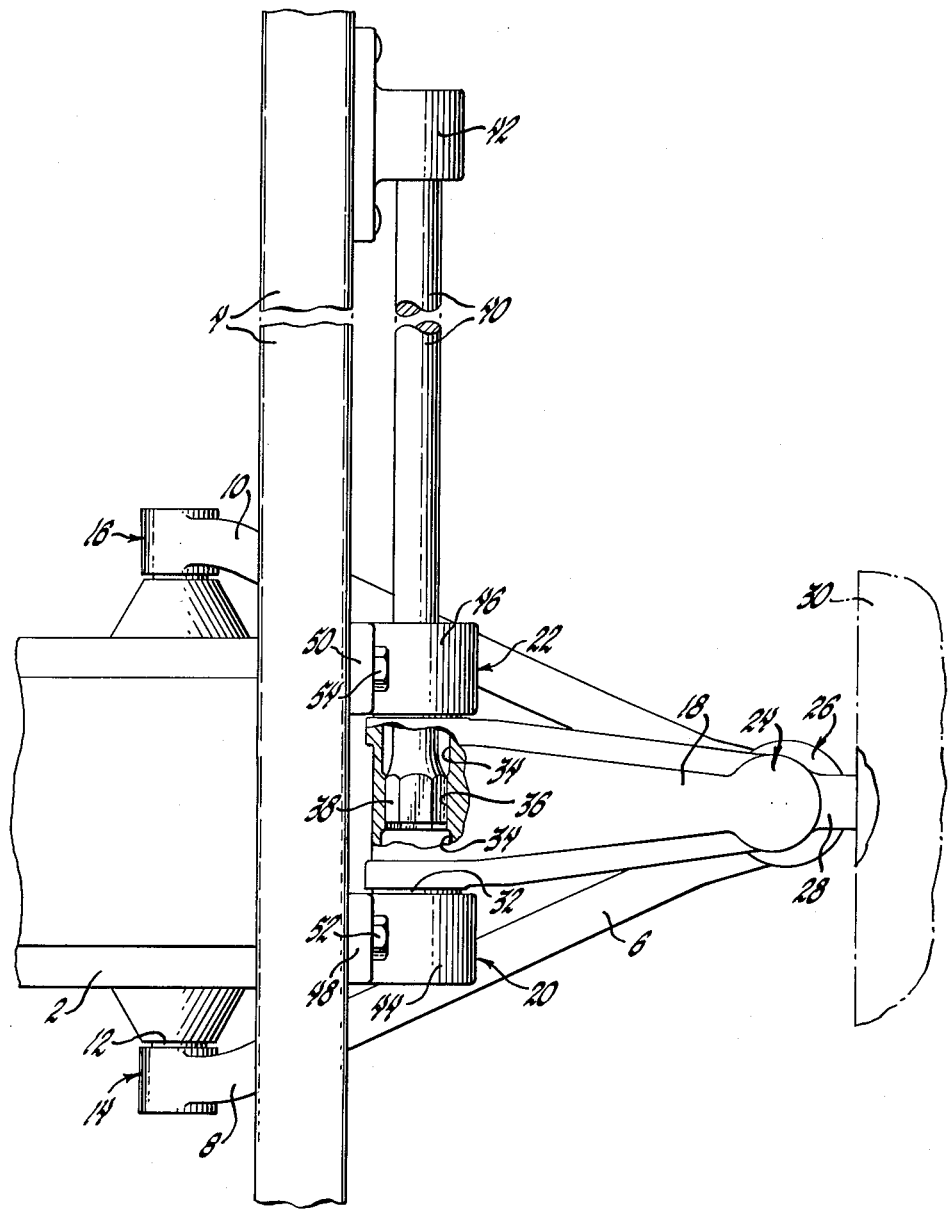
FIG. 1 is a top plan view of a portion of a vehicle chassis incorporating wheel suspension structure in accordance with the invention.
Figure 2:
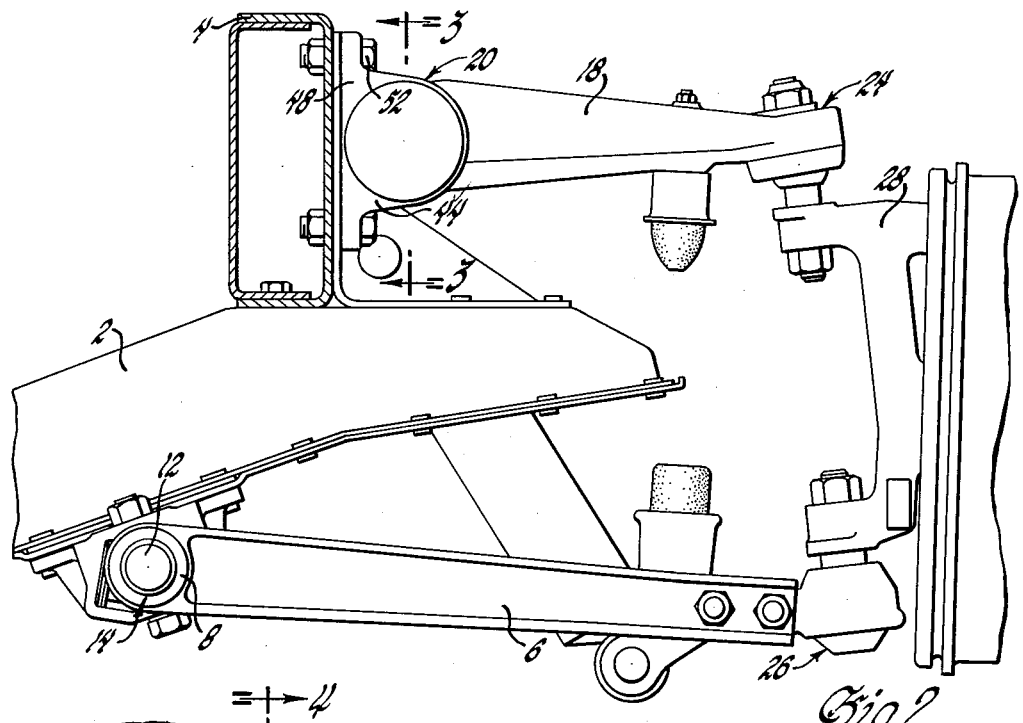
FIG. 2 is a front elevational view of the structure shown in FIG. 1.

Referring now to the drawings and particularly FIGS. 1 and 2, there is illustrated a suspension assembly for the dirigible wheels of a vehicle wherein the reference numeral 2 designates the vehicle cross frame member. Member 2 is secured to the lower side of a longitudinal frame side member 4. Extending transversely from cross frame member 2 is a wishbone type transversely extending lower control arm 6 having bifurcated inner ends 8 and 10 which are pivotally connected to a pivot shaft 12 on cross member 2 by pivot bearing assemblies 14 and 16. A generally T-shaped upper control arm 18 extends transversely from the outer side of frame side rail 4 and is pivotally connected thereto by longitudinally spaced bearing assemblies 20 and 22. At their outer ends, control arms 6 and 18 are provided with ball joint assemblies 24 and 26 which, in turn, are connected to a vertically extending wheel knuckle 28 upon which is mounted dirigible wheel 30.

In the illustrated embodiment, the inner longitudinally extending pivot shaft portion 32 of arm 18 is provided with a cylindrical bore 34 which extends therethrough from each end and merges with a hexagonal socket portion 36 longitudinally midway of arm 18. Socket portion 36 is adapted to engage a cooperating hexagonal portion 38 formed on the forward end of a torsion spring 40. Spring 40 extends rearwardly through cylindrical bore 34 and is clamped at its rearward end to side rail 4 by an anchor member 42 so that the vehicle sprung mass is supported by torsional resistance to angular movement of upper arm 18. It is to be particularly noted that in the subject construction engagement between arm 18 and spring 40 is effected at a location longitudinally equidistant to the two bearing assemblies 20 and 22, thereby preventing unequal loading of the latter.

In accordance with the general features of the invention, bearing assemblies 20 and 22 are constructed in the manner providing optimum load carrying capacity, maximum resistance to axial play, and extreme ease of assembly and disassembly. As best seen in FIG. 1, the opposite ends of pivot shaft portion 32 of arm 18 are journaled in mating sleeve structures 44 and 46. Sleeves 44 and 46 include integral ears 48 and 50 adapted to be secured to frame side rail 4 by bolts 52 and 54. Inasmuch as both bearing assemblies 20 and 22 are identical in construction, it will be understood that the following description thereof applies to both. As seen best in FIG. 3, the forward terminal end 56 of pivot shaft portion 32 is formed with a plurality of axially uniformly spaced external no-lead ribs 58 which effect bearing engagement with the corresponding no-lead threads 60 formed on the inner periphery of sleeve member 44. As seen best in FIG. 4, in accordance with one feature of the invention, male ribs 58 are arranged in two circumferentially spaced segments 62 and 64, while the female ribs 60 are arranged in two corresponding circumferential segments 66 and 68. The remaining outer periphery of shaft portion end 56 and inner periphery of sleeve 44, respectively, is relieved to provide smooth cylindrical segments 70—72 and 74—76, the diameters of which correspond to the inner pitch diameter of the respective ribs. Each of the ribbed segments extends through an angular distance slightly less than the angular distance of the adjacent relieved portions so that the ribbed segments may be disengaged by indexing the control arm 18 to a position 90° from the angular position in which maximum thread engagement is effected.

According to another feature of the invention, ribbed segments 62—64 of shaft portion 32, and 66—68 of sleeve 44 are initially oriented so that when the suspension structure is in assembled relation with the vehicle under normal load condition, the cooperating ribs will be in substantially complete angular registry. In addition, the segments are angled counterclockwise with respect to a vertical plane passing through the axis of rotation of shaft portion 32 so as to align the segmental biasing surfaces with the direction of load transfer from sleeve 44 to pivot shaft 32. In order to assure uniform distribution of lubricant received through grease fitting 78, end portion 56 of shaft 32 is provided with a longitudinal groove 80 while the central thread 58a is relieved at 82 directly beneath fitting 78.

While but one embodiment of the invention has been shown and described, it will be apparent that other changes and modifications may be made therein. It is,

We claim:
1. Independent wheel suspension for a vehicle comprising, a pair of vertically spaced transversely extending wheel control arms, a wheel knuckle extending between and pivotally connected to the outboard ends of said arms, longitudinally spaced inboard pivot bearings for one of said arms including cooperating members each having circumferentially segmented no-lead ribs for taking up radial and axial load, means for detachably securing certain of said cooperating members to the sprung mass of the vehicle, spring means operatively connected between said last mentioned arm and said sprung mass and means for pivotally connecting the other arm to said sprung mass.

2. In a motor vehicle having a sprung mass, an angularly movable wheel control arm, means pivotally connecting said control arm to said sprung mass comprising, a female bearing member detachably secured to said sprung mass, a male bearing member formed on said control arm and extending into said female member in concentric relation therewith, said bearing members having cooperating bearing surfaces comprising circumferentially spaced no-lead rib segments separated by radially relieved segments, said rib segments taking up radial and axial load, the ribbed segments of each member being disposed angularly on the respective members so that under normal load conditions maximum rib registration occurs.

References Cited in the file of this patent
UNITED STATES PATENTS

| | | |
|---|---|---|
| 753,969 | Fee | Mar. 8, 1904 |
| 947,975 | McComb | Feb. 1, 1910 |
| 2,173,973 | Leighton | Sept. 26, 1939 |
| 2,631,681 | Utz et al. | Mar. 17, 1953 |